United States Patent [19]

Lesowsky

[11] 4,353,673
[45] Oct. 12, 1982

[54] WALL ANCHOR

[76] Inventor: Joseph Lesowsky, 335 E. Taft Ave., Orange, Calif. 92665

[21] Appl. No.: 301,240

[22] Filed: Sep. 11, 1981

[51] Int. Cl.³ .................................... F16B 13/06
[52] U.S. Cl. ...................................... 411/38; 411/50
[58] Field of Search ................ 411/38, 34, 37, 35, 411/36, 59, 50, 49, 51, 386

[56] References Cited

U.S. PATENT DOCUMENTS

| 525,222 | 8/1894 | Levering | 411/51 |
| 2,762,252 | 9/1956 | Karitzky | 411/38 |
| 3,385,156 | 5/1968 | Polos | 411/37 X |

FOREIGN PATENT DOCUMENTS

| 2212795 | 9/1973 | Fed. Rep. of Germany | 411/38 |
| 1309392 | 3/1973 | United Kingdom | 411/51 |

*Primary Examiner*—Ramon S. Britts
*Attorney, Agent, or Firm*—Perry E. Turner

[57] ABSTRACT

There is disclosed a wall anchor structure having a hollow body in which spaced ribs extend from a flanged portion at one end to a sleeve in which an axially movable nut element is captured. A bolt extends through the body from the flanged end to threadedly engage the nut. With the bolt head abutting the flange, the structure is struck or otherwise inserted through a dry wall or wallboard to bring the flange flush against the inner surface of the wall. The bolt, being slidable, is grasped at the head and pulled out to separate the head from the flange an amount permitted by the axial travel of the nut. This permits the jaws of an anchor operating tool to be inserted between the head and flange, and forced apart to forcibly separate the head and flange further, causing the ribs to deform so as to bite into and interlock with the wall material. The bolt is then threaded out of the nut and removed to permit a bracket or other support member for shelving or the like to be seated against the flange. The bolt is then reinserted to threadedly engage the nut, and turned until the bolt head seats against and secures the bracket firmly against the flange, and hence to the wall. Different sleeve and nut shapes are disclosed, as are different provisions for capturing the nut within the sleeve.

6 Claims, 11 Drawing Figures

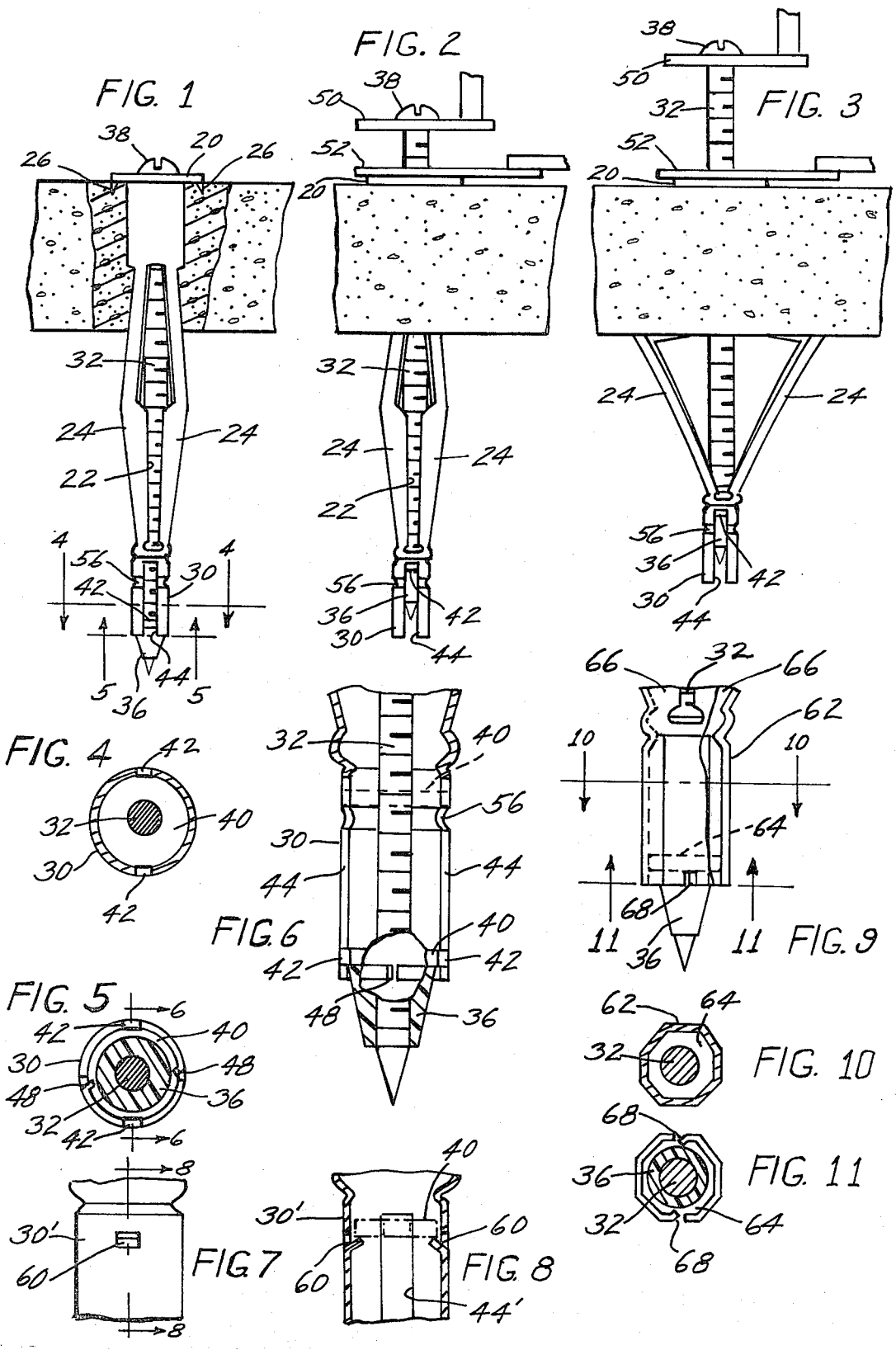

WALL ANCHOR

CROSS-REFERENCE TO RELATED APPLICATIONS

This application relates to my copending application, "Tool and Method For Operating Wall Anchors," Ser. No. 178,544, filed Aug. 15, 1980.

BACKGROUND OF THE INVENTION

1. Field of the Invention

This invention relates to hollow wall anchors of the type having deformable body portions to interengage and interlock with wall material.

2. Description of the Prior Art

This invention is an improvement in the type of hollow wall anchor that is currently in widespread use. Such prior art device is formed from a hollow tube with a flange at one end to be seated against the inner surface of a plaster wall or wallboard, and which at its opposite end is threaded to receive the inner end of a threaded bolt that extends through the tube from the flanged end. The body of the tube intermediate its end portions has spaced longitudinal slots, whereby the body is formed as a cage of thin ribs. In the assembled structure, the bolt is threaded in so that its head abuts the flange. The inner end of the bolt may be pointed, and a tapered or frusto-conical member threaded thereon, so as to permit the structure to quickly penetrate and pass through the wall when the head is struck to hammer the structure into place.

As explained in my aforementioned copending application, such an anchor is anchored in place where driven by prior art practices via turning the bolt head against the flange with a screwdriver. Such turning is continued as needed to draw the inner end of the body towards the wall, causing the ribs to deform so they are force into, and interlock with, the wall material.

With the advent of the method and hand tool of my invention as disclosed in the aforementioned copending application, the time consuming method of operating such a wall anchor via a screwdriver is eliminated. Instead, the bolt is partially withdrawn, by unscrewing it to space the head from the flange, inserting the tool jaws between the head and flange, and forcing the jaws apart so as to increase the separation between head and flange, thereby drawing the inner end of the body towards the flange and effecting the deformation of the ribs for interlocking with the wall material.

While my method and apparatus greatly increase the speed with which wall anchors can be inserted into and anchored in a wall, and thereby increasing the mounting of large numbers of shelves, cabinets and the like on such walls, the need for unthreading of the bolts of such wall anchors is still an undesirable limitation and obstacle to desired increased work output.

BRIEF DESCRIPTION OF THE DRAWING

FIG. 1 is a view in elevation of a wall anchor of the invention inserted through a plaster or dry wall, such wall being shown as a fragment in elevation with the portion through which the wall anchor extends being in section;

FIG. 2 is a view in elevation wherein the bolt has been slidably moved outwards to separate the bolt head from the flange, and showing the jaws of an operating tool inserted between the head and flange;

FIG. 3 is a view in elevation wherein the jaws have exerted oppositely directed forces against the head and flange so as to further separate them and cause the ribs to deform and interlock with the wall material;

FIG. 4 is a sectional view taken along the line 4—4 of FIG. 1, showing the nut with ears riding in slots in the sleeve to prevent its turning during turning of the bolt therein;

FIG. 5 is a sectional view taken along the line 5—5 of FIG. 1, showing tabs struck inwardly at the end of the sleeve for retaining the nut therein;

FIG. 6 is an enlarged, longitudinal sectional view of the inner portion of the wall anchor taken along the line 6—6 of FIG. 5, to aid in explaining provision for trapping the nut after it is moved to the position shown in FIG. 3;

FIG. 7 is a fragmentary view in elevation of a modified sleeve portion of the body showing an alternative structural means for trapping the nut;

FIG. 8 is a fragmentary sectional view taken along the line 8—8 of FIG. 7;

FIG. 9 is a fragmentary view in elevation, partly broken away, of a further modification of wall anchor in accordance with the invention, wherein the nut and surrounding sleeve portion are slidably mated hexagonal elements;

FIG. 10 is a sectional view taken along the line 10—10 of FIG. 9; and

FIG. 11 is a sectional view taken along the line 11—11 of FIG. 9.

DESCRIPTION OF ILLUSTRATIVE EMBODIMENTS

Referring to FIGS. 1 and 4-6, an improved hollow wall anchor in accordance with the invention comprises a metal tubular body having a flange 20 at one end, and which is longitudinally slotted as at 22 to provide spaced ribs 24. The flange 20 has pointed tabs 26 struck therefrom which are adapted to interlock with the inner surface of a dry wall or wallboard when the flange is brought flush against the wall, such ears serving to prevent the anchor from turning in the wall prior to its being interlocked therewith.

Extending beyond the cage formed of the slots 22 and ribs 24 is a sleeve 30. A threaded bolt 32 extends through the entire body, and is preferably the type that has a pointed end. Also, as with a current wall anchor, a frusto-conical element 36, usually of plastic, is threaded onto the pointed end of the bolt. The tapers of the pointed end and the element 36 facilitate puncture and passage of the assembly through the wall 28. To this end, the bolt is initially positioned with its head 38 abutting the flange 20. With the pointed end of the bolt on the inner surface of the wall 28 at the place where it is desired to insert the wall anchor, the bolt head is struck to drive the body through the wall and seat the flange against the wall in usual fashion.

Captured within the sleeve 30 is a nut 40 (FIGS. 4-6) through which the bolt is threaded. When the bolt is turned, the nut is prevented from undergoing rotational movement via ears 42 which are slidable is slots 44 formed in the sleeve 30. In this embodiment, the sleeve is circular, as is the nut. Accordingly, in order that the nut can undergo axial movement within the sleeve, it is sufficient to grasp the bolt head with one's fingers and move the bolt axially.

The extent of such sliding movement of the bolt is determined by the permissable travel of the nut. In this regard, limits are established by the closed ends of the slots 44 and obstructions in the open, inner end of the sleeve 30. As best seen in FIGS. 5 and 6, such obstructions are comprised of tabs 48 which are struck inwardly from the body of the sleeve. The tabs 48 extend inwardly so that the distance between them is significantly less than the diameter of the nut 40. The nut cannot pass out of the open end of the sleeve due to the interference by the tabs 48, and cannot move past the slots in the opposite direction due to interference of the closed ends of the slots with the ears 42. As will be noted, the distance between the tabs 48 is also greater than the diameter of the large end of the frusto-conical element 36, whereby to permit such element to move into the sleeve when the bolt is drawn out as in FIG. 2.

FIG. 2 shows the bolt pulled out to separate the bolt head from the flange, and the jaws 50, 52 of an anchor operating tool are inserted between the head and flange. As disclosed in my aforementioned copending application, such jaws are forked elements preferably, and they straddle the bolt. The tool is then operated so the jaws apply oppositely directed forces against the flange 20 and bolt head 38. In the arrangement illustrated, this causes the upper jaw 50 to move away from the lower jaw 52 and the flange. In turn, by virtue of the engagement of the ears 42 of the nut against the closed ends of the slots 44 (see FIG. 3), this upward force is applied against the sleeve 30. The ribs 24 deform, and their upper portions are forced into the material of the wall 28, and thereby interlock with such material.

Thus, with this invention there is no time lost in unscrewing a bolt to utilize a tool as described, as is required with previously known wall anchors. Since the bolt, nut and sleeve arrangement permits the bolt to be axially slidable, the steps required to operate the wall anchor of this invention, and interlock it with wall material, are greatly simplified. A substantially greater number of wall anchors can be inserted and expanded than has heretofore been possible. This increases work output by a single tool operator to a significant degree, so as to speed up construction at a site and thereby contribute to a saving in labor costs and time to complete a project.

In this latter regard, operations proceed in the usual manner after securing a desired number of such wall anchors in a wall. The bolts are unthreaded from the nuts and removed. Then brackets or other supports for shelves, cabinets or the like are positioned against the flanges with their openings aligned. The bolts are then reinserted and threaded into the nuts until the bolt heads are turned tightly against the elements so they are firmly secured in place.

In the wall anchor of this invention, the axially movable nut may be retained in the position indicated in FIG. 3 when the bolt is removed. In one arrangement, the sleeve 30 is crimped at 56 (see FIGS. 1-3 and 6) a short distance from the closed ends of the slots 44. When the nut is moved out to the position wherein the ears 42 engage the closed ends of the slots, the periphery of the nut effectively engages the crimped portions of the split sleeve and cams the split sections out of its way. Thereafter, after the bolt is removed, the nut is trapped between the closed ends of the slots and the crimped portion 56.

This provision permits relatively loose tolerances to be employed for the diameter of the nut relative to the inner diameter of the sleeve, and prevents the nut from cocking or tilting over so the bolt cannot threadedly engage it when reinserted. In this latter regard, if the nut is relatively thin and tolerances are sufficiently loose, the nut may be able to be dislodged before the bolt is reinserted without the provision for trapping it in a confined space as described.

On the other hand, such a provision for trapping the nut can be dispensed with where the nut is relatively thick and its edge is in normal sliding engagement with the inner wall of the sleeve. For such arrangement, the reinsertion of the bolt causes the nut to be moved against the obstructing flanges 48 at the open end of the sleeve 30. Turning the bolt causes the requisite threaded engagement, and the bolt is turned until the nut ears 42 engage the closed ends of the slots and the bracket or other support element is secured to the wall. It will be apparent that the frusto-conical element 36 may pass out of the sleeve when the bolt is removed; its purpose is served only upon initial insertion or driving of the anchor into the wall.

FIGS. 7 and 8 illustrate a further trapping arrangement for the nut. In this arrangement, the sleeve 30', which corresponds to the sleeve 30 of FIGS. 1-6, has tabs 60 struck inwardly from its body at the desired distance from the closed ends of the slots 44'. In moving to the closed ends of the slots, the nut 40 cams past the tabs 60, which are thereafter in interference relation with the nut so as to keep it trapped between them and the closed ends of the slots.

FIGS. 9-11 illustrate this invention wherein the body has a sleeve 62 and a nut 64 which are noncircular. The sleeve is not slotted as in the previous embodiments described. In this example, both the sleeve 62 and nut 64 are hexagonal, the sleeve 62 having inner dimensions significantly larger than the inner dimension of the adjacent portion of the body in which the deformable ribs 66 are formed. As with the previously described wall anchors, the open end of the sleeve 62 has inward tabs 68 struck therefrom.

The operation of the wall anchor with the sleeve and nut arrangement of FIGS. 9-11 is the same as previously described for the other embodiments. If desired, the sleeve 62 may be provided with means as previously described for trapping the nut 64 adjacent the ribbed portion of the body, i.e., the end of the sleeve 62 against which the nut acts to cause the ribs 66 to deform and interlock with wall material as in the manner of the wall anchor shown in FIGS. 1-3.

It will be apparent that this invention embraces a variety of shapes for the nut and sleeve. Whereas the portion of the body in which the ribs are formed may be generally cylindrical immediately adjacent the sleeve, the sleeve may be square, elliptical or any other desired shape; the nut, of course, is shaped to facilitate axial movement within such sleeve. Also, it is necessary that the sleeve and nut be cooperably shaped to prevent the nut from turning in the sleeve when the bolt is inserted to threadedly engage it, either in initial assembly of the wall anchor or at the site when the bolt is removed and then reinserted as described herein. Also, it will be seen that my invention embraces the structure shown for wall anchors without entry assisting means such as the element 36, i.e., wherein holes are drilled in walls and the anchors inserted therein.

I claim:
1. A wall anchor comprising:
 a tubular body having a flange at one end,
  said body having elongated slots therein to provide spaced elongated ribs;

a sleeve extending from the other end of said body;
a nut element coaxial with and located within said sleeve,
    said nut element and said sleeve having cooperating means for permitting non-rotative axial sliding movement therebetween;
means within said sleeve to limit movement of said nut element therein;
and a threaded bolt extending through said body and said sleeve and threadedly engaging said nut element on the inner end of said bolt,
    said bolt having a head to engage said flange,
    said bolt being slidable out of said body by grasping said head,
    said head upon slidable movement of said bolt being spaced from said flange a distance determined by the limits of movement of said nut element in said sleeve.

2. The combination of claim 1, wherein said sleeve is cylindrical and said nut element is circular,
    said sleeve having slots therein,
    and said nut element having protrusions therefrom which ride in said slots.

3. The combination of claim 1, wherein said sleeve and nut element are mating noncircular members.

4. The combination of claim 2, wherein said sleeve is formed to trap said nut element adjacent the closed ends of the slots therein when said nut element is forced to said closed slot ends.

5. The combination of claim 1, wherein a portion of the open end of said sleeve is shaped to prevent said nut element from passing out of said open end.

6. The combination of claim 2, wherein said protrusions engage the sleeve at the closed ends of said slots at the outer limit to which said bolt head is positioned upon sliding said bolt outwardly,
    the spacing between said bolt head and said flange permitting jaws of an operating tool to be inserted between them,
    said ribs deforming upon forcing said bolt head further from said flange upon application of oppositely directed forces upon said head and flange by said jaws.

* * * * *